(12) United States Patent
White

(10) Patent No.: US 6,861,148 B2
(45) Date of Patent: Mar. 1, 2005

(54) PLASTIC OPTICAL FIBER PREFORM

(75) Inventor: Whitney White, Chatham, NJ (US)

(73) Assignee: Chromis Fiberoptics, LLC, Murray Hill, NJ (US)

( * ) Notice: Subject to any disclaimer, the term of this patent is extended or adjusted under 35 U.S.C. 154(b) by 9 days.

(21) Appl. No.: 10/302,516

(22) Filed: Nov. 22, 2002

(65) Prior Publication Data

US 2004/0101691 A1 May 27, 2004

(51) Int. Cl.⁷ .......................... B32B 1/08; B32B 27/06; B32B 27/20; B32B 27/30; G02B 6/02
(52) U.S. Cl. ....................... 428/421; 428/422; 428/522; 428/542.8; 385/123; 385/127; 385/128; 385/142
(58) Field of Search ................................. 385/142, 123, 385/127, 128; 428/421, 422, 522, 542.8

(56) References Cited

U.S. PATENT DOCUMENTS

| | | | |
|---|---|---|---|
| 5,541,247 A | | 7/1996 | Koike |
| 5,851,666 A | | 12/1998 | Nonaka et al. .............. 428/380 |
| 5,916,971 A | * | 6/1999 | Koike et al. ................. 525/197 |
| 6,086,999 A | | 7/2000 | Hvashenko ................... 428/375 |
| 6,188,824 B1 | * | 2/2001 | Teshima ...................... 385/126 |
| 6,254,808 B1 | * | 7/2001 | Blyler et al. ................ 264/1.29 |
| 2003/0044136 A1 | * | 3/2003 | Nakamura et al. .......... 385/102 |
| 2003/0134119 A1 | * | 7/2003 | Zhen et al. .................. 428/375 |

* cited by examiner

*Primary Examiner*—Ramsey Zacharia
(74) *Attorney, Agent, or Firm*—Thomas, Kayden, Horstemeyer & Risley, LLP

(57) ABSTRACT

A preform from which plastic optical fiber is to be drawn in an infrared heating furnace has a core portion with either a step index or graded-index profile, and a cladding layer surrounding the core portion, the cladding layer. A jacket layer surrounds the cladding layer and is also made of an at least partially fluorinated jacket material.

16 Claims, 1 Drawing Sheet

PLASTIC OPTICAL FIBER PREFORM

FIELD OF THE INVENTION

This invention relates to a plastic optical fiber (POF) preform having superior heat transfer properties.

BACKGROUND OF THE INVENTION

Plastic optical fibers (POF) which comprise both a core and cladding of plastic material, i.e., polymers, which may or may not be combined with other materials have gained increased usage for short haul signal transmission lines. Generally speaking, such fibers are considerably less costly than typical glass optical fiber. However, they have higher losses than the latter, hence use is restricted to short distances, such as LAN (local area network) and ISDN (integrated service digital network) where they have proven to be quite useful. In general, such a POF may comprise a core of, for example, an optical polymer of polymethyl methacrylate (PMMA) and a polymeric cladding therefor. In general, a plastic optical fiber is encased in a jacket layer for protection of the enclosed fiber. In many types of POF, the jacket layer is applied after the fiber is drawn from the perform. This jacket layer may be either strippable or non-strippable. A strippable jacket typically comprises a material with very weak adhesion to the cladding material, and is stripped away at a fiber end during connector attachment. A non-strippable jacket typically comprises a material with very strong adhesion to the cladding material, and connectors are typically applied over such a jacket. In the latter case, the jacket material is often chemically very similar to the cladding material, and may even be chemically identical.

Unlike silica based optical fiber (glass) wherein the fiber is drawn from a preform in a draw furnace where heat transfer is achieved primarily by radiation, POF is most often drawn from a resistive furnace wherein heat transfer occurs largely by conduction, mainly because much lower temperatures (200°–300° C.) are involved. At such temperatures, the blackbody radiation from a typical electrical resistive furnace occurs predominantly at mid-infrared wavelengths of ten microns ($\mu$m) or longer, which, unfortunately is a region where optical absorption of the polymers is extremely strong. In such a situation, heat transfer into the central region of the preform is very slow and is accompanied by unacceptable temperature gradients across the preform. This restriction on heat transfer ultimately limits the maximum draw speed as well as the preform size that may be used in POF production, thereby leading to high production costs and reducing the advantage of POF over glass fiber.

The heat transfer process has been improved in the prior art through the use of infrared lamp furnaces, which are typically constructed from arrays of halogen lamps. Such lamps usually have filaments that operate at temperatures approaching 2500K and thus emit radiation at wavelengths that are predominantly in the one to two micron (1–2 $\mu$m) range. In this wavelength range, typical optical polymers such as are used in POF, such as polymethyl methacrylate, are considerably more transparent than at the longer wavelengths. As a consequence, the incident radiation from the lamps penetrates farther into the preform, with a consequent more uniform and more rapid heat transfer. Despite this marked improvement, even in the 1–2 $\mu$m band, optical polymers such as PMMA absorb a large fraction of the incident radiation within a thickness of fifteen to twenty millimeters (15–20 mm). Thus, even with infrared lamp heating, heat transfer processes still place significant limitations on preform diameter and draw speed.

SUMMARY OF THE INVENTION

The present invention, in the several embodiments thereof, involves the use of perfluorinated or partially fluorinated polymers for producing more efficient heating of a preform. Fluorinated polymers have much lower optical absorption in the 1–2 $\mu$m band than protonated polymers, due to the lower resonance frequencies of carbon-fluorine bands compared to those of the carbon-hydrogen bands in protonated polymers. Thus, heat transfer from the infrared lamps of the furnace to the polymer preform is regulated by controlling the degree of fluorination of the polymers at various locations in the preforms. For example, in the 1–2 $\mu$m band, optical absorption is inversely proportional to the degree of fluorination of the polymer. A particular advantage thus gained is that the introduction of fluorinated materials into the preform allows the use of longer infrared wavelengths to achieve the desired depth of penetration of the heat. Inasmuch as longer wavelengths are produced by sources with cooler filament temperature, similar operation of the source and longer component lifetimes result.

In a first preferred embodiment of the invention, the preform comprises both a core and cladding of perfluorinated polymers. In addition, the preform, prior to the drawing process, includes a jacket or jackets added for mechanical strength that also are of perfluorinated polymer. Thus, the entire preform, including the jacket or jackets, comprises perfluorinated polymers.

In another embodiment of the invention, the entire preform, including optical core, optical cladding, and jacket or strengthening layers comprise partially fluorinated polymeric materials. In this embodiment, in the optical layers, the degree of fluorination is determined by the optical transparency specifications for the fiber (POF). The optical transparency of an amorphous polymer increases with an increase in the degree of fluorination. In the mechanical layer (jacket) the degree of fluorination required is determined primarily by the requirement that radiation from the furnace penetrate substantially throughout the preform.

In still another embodiment of the invention, the optical core and optical cladding of the preform comprise perfluorinated polymers, because of the generally superior optical properties of such polymers, and the mechanical reinforcement layer (jacket or jackets) comprises partially fluorinated polymers of sufficient degree of fluorination to insure that the radiation from the furnace penetrates substantially throughout the preform.

In all of the embodiments of the invention, the compositions of the polymer layers are chosen to optimize the simplicity and reliability of the optical source. In addition, the embodiments are all preforms to which the mechanical or strength jackets have been added prior to drawing the fiber, thus eliminating the step or steps of adding the strength or mechanical layers to the fiber after it has been drawn.

These and other features of the present invention, and the principles involved, will be more readily apparent from the following detailed description, read in conjunction with the drawings.

DETAILED DESCRIPTION

Figure 1:
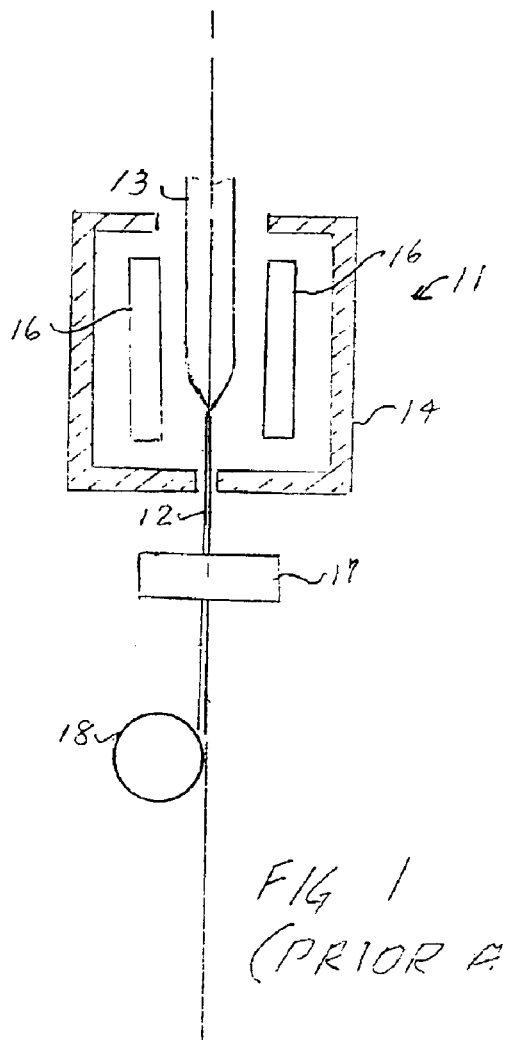
FIG. 1 is a diagrammatic view of apparatus for drawing POF from a preform.

In FIG. 1 there is depicted, diagrammatically, a prior art draw furnace 11 for drawing a plastic optical fiber 12 from a preform 13. The furnace 11 comprises a housing 14 containing, for example, one or more halogen lamps 16 operating as discussed hereinbefore at filament temperatures in the neighborhood of 250° K and emitting radiation in the one to two micron (1–2μ) range, at which the polymers of the preform are more transparent than at longer wavelengths. After the fiber 12, which comprises a core and cladding structure, is drawn, it is coated with a jacket or sheath (not designated in FIG. 1) so as to protect the main body of the plastic fiber 12 which is the signal transmitting portion, by passing it through a coating apparatus 17. Apparatus 17 may take any of a number of forms, such as die coating by extrusion, or other suitable apparatus which adds to both production time, complexity, and cost. The protective material, in the case of a non-strippable jacket has usually been chosen, in the prior art, to match the glass transition temperature and/or thermal expansion properties of the optically functional layers of the fiber, thereby minimizing the extrinsic attenuation caused by microbending of the fiber. In the case of a strippable jacket, the jacketing material is typically chosen for its good heat resistance and good weathering resistance. After jacketing, the fiber 17 is then wound on a drum 18, for example. It is to be understood that FIG. 1 is simply a diagram and the apparatus shown is not intended to be definitive of any particular arrangement or apparatus.

As was pointed out hereinbefore, despite the improvements in heat transfer realized through the use of infrared radiation, even in the 1–2 μm band, optical polymers such as PMMA absorb a large fraction of the incident radiation within a thickness of fifteen to twenty millimeters. Therefore, the draw process is necessarily slowed down to permit the heat transfer to penetrate to the center of the preform. According to the prior art studies of heat transfer in infrared furnaces to PMMA preforms, the absorption spectrum of PMMA is such that in the 1–2μ band, approximately fifty percent (50%) of the incident radiation is absorbed within 15 mm of the preform surface, assuming uniform spectral intensity. Consequently, where preform diameters exceed 45–60 mm significant temperature variations occur between the outer surface and the center of the preform.

Figure 2:
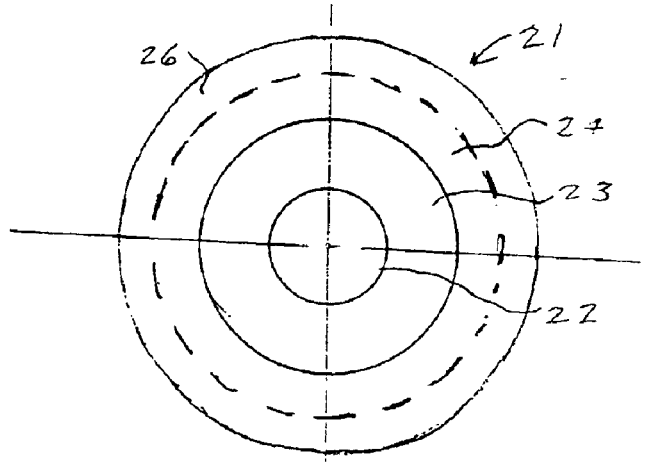
FIG. 2 is a cross-section elevation view of the preform of the invention.

In FIG. 2 there is shown in cross-section, the preform 21 of the present invention, which comprises a core 22, a cladding layer 23, and an outer jacket or sheath 24. When jacket 24 is included as a part of the preform, it participates in the drawing process and the output of furnace 11 is a jacketed fiber 12, thereby making unnecessary the apparatus 17 shown in FIG. 1 and reducing complexity, time delay, and cost in the draw process. Heretofore, when the preform has included the jacketing layer, it has caused the heat transfer to take unduly long, and has placed limitation on the preform size (diameter), thereby limiting the amount of fiber that can be drawn from the preform. In accordance with the invention, the penetration depth of the radiation incident on the preform is increased by using a fluorinated material in the jacket layer 24. Fluorinated polymers have much lower optical absorption in the 1–2μ band than protonated (non-fluorinated) polymers because the resonance frequencies of carbon-fluorine bonds are considerably lower than those of the carbon-hydrogen bonds in protonated polymers. Thus, it is advantageous to fluorinate the polymers which the cladding 23 is comprised and, too, the polymers of the core. Following are the preferred embodiments of the present invention and examples of the materials used.

Embodiment I

The preform 21 is made with a step-index or graded-index core composed of an amorphous perfluorinated polymer, such as copolymers of tetrafluorethylene-co-2,2-bistrifluoromethyl-4,5-difluoro-1,2-dioxole (more commonly known under the trade name Teflon AF) combined with a small-molecule index raising dopant such as chlorotrifluoroethylene oligomers. This core material is then surrounded by undoped Teflon AF cladding material to form the light guide. A third layer is then added outside of the cladding to add mechanical strength to the drawn fiber. Since the Teflon AF material is quite expensive, it is desirable to choose a less expensive perfluorinated polymer for the outermost layer, such as fluorinated ethylene propylene. In this and in subsequent embodiments, the jacket layer may be formed from a crystalline or partially crystalline perfluorinated polymer, as a blend of perfluorinated polymers, or a blend of partially fluorinated and perfluorinated polymers.

A preform of this type will show excellent transparency in the near infrared, with penetration depths typically exceeding a meter in the 1–2 micron wavelength band. Hence, an infrared furnace with longer wavelength emission will most likely be preferred in this embodiment.

Embodiment II

A graded-index preform 21 is fabricated according to prior art, for example, using an interfacial gel polymerization technique (Koike U.S. Pat. No. 5,541,247). In such a process one may mix a solution primarily composed of 2,2,2-trifluorethyl methacrylate (hereinafter referred to as fluorinated methacrylate) and a suitable index-raising dopant inside a tube of partially fluorinated poly (alkylmethacrylate), and subsequently polymerize the fluorinated methacrylate. During the course of the polymerization process, the index raising dopant will preferentially concentrate near the center of the mixture, resulting in a partially fluorinated graded-index preform.

According to the invention, an additional layer of partially fluorinated material (e.g., partially fluorinated poly (alkylmethacrylate) or poly (methylmethacrylate)/poly (vinylidene fluoride) blend) may be added to the graded-index preform before drawing the preform into an optical fiber. If all of the materials are chosen to be approximately 50% fluorinated, then the penetration depth of the radiation from a 1–2 micron band infrared furnace will be roughly doubled in comparison to that for PMMA. Hence, we may expect a penetration depth (defined by 50% absorption) of roughly 30 mm.

Embodiment III

A preform 21 is made with a step-index or graded-index core composed of an amorphous perfluorinated polymer, such as poly(perfluorobutenylvinyl ether) (more commonly known under the trade name CYTOP) combined with a small-molecule index raising dopant such as chlorotrifluoroethylene oligomers. This core material would then be surrounded by undoped CYTOP cladding material to form the light guide. A fluorinated third layer is then added outside of the cladding to add mechanical strength to the drawn fiber. Since the CYTOP material is quite expensive, it is desirable to choose a less expensive fluorinated polymer for the outermost layer, such as a poly(methylmethacrylate)/poly(vinylidene fluoride) blend. The fluorinated third layer may, alternatively, be a blend of partially fluorinated polymers or a blend of a partially fluorinated polymer and one or more non-fluorinated polymers.

If the polymer blend composing the outer layer is chosen to be approximately 50% fluorinated, then the penetration depth of the radiation from a 1–2 micron band infrared furnace will be roughly 30 mm. Thus, if the perfluorinated (optical core and cladding) portion of a preform has a diameter of 30 mm, the radial temperature distribution in a preform with 100 mm outer diameter will be relatively uniform, even if the furnace length is quite short.

Embodiment IV

In all of the foregoing embodiments, the jacket 24 is either perfluorinated or at least partially fluorinated. It is also possible to have the jacket 24 comprise two layers 24 and 26 as shown in FIG. 2 by the dash lines.

A partially fluorinated graded-index preform 21 with at least a partially fluorinated cladding 23 is produced as in embodiment II. Then, an additional layer of non-fluorinated material (e.g. poly(methylmethacrylate) is added to the graded-index preform before drawing the preform into an optical fiber. In this embodiment, the penetration depth of the radiation from a 1–2 micron band infrared furnace will be roughly 15 mm in the outer layer, since that layer is non-fluorinated. However, the inner layers of the preform (optical core and cladding) will have a much longer penetration depth, approximately 30 mm if 50% fluorinated. Thus, if the prefluorinated (optical core and cladding) portion of a preform has a diameter of 40 mm, the radial temperature distribution in a preform with 70 mm outer diameter will be relatively uniform, even if the furnace length is quite short.

In this embodiment, the partial fluorination of the optical core and cladding layers serve both to reduce the optical attenuation of the fiber, and to facilitate the penetration of infrared radiation into the preform.

In all of the foregoing embodiments, the preform has an outer protective jacket and which, makes production of the fiber a simple, less time consuming, and cheaper operation.

It is to be understood that the various features of the present invention might be incorporated into other types of preforms, and that other modifications or adaptations might occur to workers in the art. All such variations and modifications are intended to be included herein as being within the scope of the present invention as set forth in the claims. Further, in the claims hereinafter, the corresponding structures, materials, acts, and equivalents of all means or step-plus-function elements are intended to include any structure, materials, or acts for performing the functions in combination with other elements as specifically claimed.

What is claimed is:

1. A preform for drawing plastic optical fiber comprising:
    a core comprising polymers that are at least partially fluorinated;
    a cladding layer surrounding said core, said cladding layer comprising a polymer that is at least partially fluorinated; and
    a jacket layer surrounding said cladding layer, said jacket layer comprising a polymer material that comprises one of the following:
        (a) a blend of perfluorinated polymers:
        (b) a blend of a perfluorinated polymer and a partially fluorinated polymer; and
        (c) a blend of a fluorinated polymer and a non-fluorinated polymer.

2. A preform as claimed in claim 1 wherein the jacket layer includes an amorphous perfluorinated polymer.

3. A preform as claimed in claim 1 wherein the jacket layer includes a crystalline or partially crystalline perfluorinated polymer.

4. A preform as claimed in claim 1 wherein the jacket layer is a blend of one or more perfluorinated polymers and one or more nonfluorinated polymers.

5. A preform as claimed in claim 1 wherein said core is a graded index core comprising:
    an amorphous perfinorinated polymer having an index raising dopant therein; and
    said cladding layer is an undoped perfluorinated polymer.

6. A preform as claimed in claim 5 wherein said jacket layer includes a fluorinated ethylene propylene material.

7. A preform as claimed in claim 1 wherein said core comprises a partially fluorinated acrylic polymer having an index raising dopant therein; and
    said cladding layer comprises a partially fluorinated acrylic polymer.

8. A preform as claimed in claim 7 wherein said jacket layer includes a partially fluorinated acrylic polymer material.

9. A preform as claimed in claim 1 wherein said core comprises a perfluorinated polymer of poly (perfluorobutenylvinylether) having an index raising dopant therein; and
    said cladding layer comprises an undoped perfluorinated polymer of poly (perfluorobutenylvinyl ether).

10. A preform as claimed in claim 1 wherein said jacket layer comprises an inner layer of at least partially fluorinated material and an outer layer of non-fluorinated material.

11. A preform as claimed in claim 10 wherein said outer layer comprises poly(methylmethracrylate) material.

12. A preform for drawing plastic optical fiber comprising:
    a core comprising a partially fluorinated acrylic polymer having an index raising dopant therein;
    a cladding layer surrounding said core, said cladding layer comprising a partially fluorinated acrylic polymer; and
    a jacket layer surrounding said cladding layer, wherein said jacket layer comprises a blend of poly (methylmethacrylate) and a poly (vinylidene fluoride).

13. A preform for drawing plastic optical fiber comprising:
    a core comprising a partially fluorinated acrylic polymer having an index raising dopant therein;
    a cladding layer surrounding said core, said cladding layer comprising a partially fluorinated acrylic polymer; and
    a jacket layer surrounding said cladding layer, said jacket comprising a polymer material that is at least partially fluorinated,
    wherein the material of said core, the material of said cladding layer, and the material of said jacket layer are each approximately 50% fluorinated.

14. A preform for drawing plastic optical fiber comprising:
    a core comprising a partially fluorinated acrylic polymer having an index raising dopant therein;
    a cladding layer surrounding said core, wherein said cladding layer comprises a partially fluorinated poly (alkylmethacrylate) material and an undoped perfluorinated polymer of poly (perfluorobutenylvinyl ether); and
    a jacket layer surrounding said cladding layer, said jacket comprising a polymer material that is at least partially fluorinated.

15. A preform for drawing plastic optical fiber comprising:
    a core comprising a partially fluorinated acrylic polymer having an index raising dopant therein;
    a cladding layer surrounding said core, wherein said cladding layer comprises a blend of poly (methylmethacrylate) and a poly (vinylidene fluoride)

and said cladding layer further comprises an undoped perfluorinated polymer of poly (perfluorobutenylvinyl ether); and a jacket layer surrounding said cladding layer, said jacket comprising a polymer material that is at least partially fluorinated.

16. A preform for drawing plastic optical fiber comprising:

a core comprising a partially fluorinated acrylic polymer having an index raising dopant therein;

a cladding layer surrounding said core, wherein said cladding layer comprises a partially fluorinated acrylic polymer material and an undoped perfluormated polymer of poly (perfluorobutenylvinyl ether); and a jacket layer surrounding said cladding layer, said jacket comprising a polymer material that is at least partially fluorinated.

* * * * *